(12) United States Patent
Zhang et al.

(10) Patent No.: US 10,523,737 B2
(45) Date of Patent: Dec. 31, 2019

(54) INFORMATION PROCESSING METHOD AND APPARATUS

(71) Applicant: Beijing Kingsoft Internet Security Software Co Ltd, Beijing (CN)

(72) Inventors: Wentao Zhang, Beijing (CN); Chuanjia Cheng, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 194 days.

(21) Appl. No.: 15/327,982

(22) PCT Filed: Jun. 25, 2015

(86) PCT No.: PCT/CN2015/082355
§ 371 (c)(1),
(2) Date: Jan. 20, 2017

(87) PCT Pub. No.: WO2016/015531
PCT Pub. Date: Feb. 4, 2016

(65) Prior Publication Data
US 2017/0208115 A1    Jul. 20, 2017

(30) Foreign Application Priority Data
Jul. 31, 2014    (CN) .......................... 2014 1 0374080

(51) Int. Cl.
*H04L 29/08*    (2006.01)
*G06F 16/957*    (2019.01)
*G06Q 30/02*    (2012.01)

(52) U.S. Cl.
CPC .......... *H04L 67/02* (2013.01); *G06F 16/9574* (2019.01); *G06Q 30/0277* (2013.01); *H04L 67/10* (2013.01)

(58) Field of Classification Search
CPC ........ G06F 17/30861–17/30905; G06F 3/048; G06Q 30/0264; G06Q 30/0262
See application file for complete search history.

(56) References Cited

U.S. PATENT DOCUMENTS 6,864,904 B1 *   3/2005   Ran .................. G06F 17/30905
                                                        707/E17.121
9,104,664 B1 *   8/2015   Jain ........................ G06F 16/00
(Continued)

*Primary Examiner* — Jennifer N To
*Assistant Examiner* — Liang Li
(74) *Attorney, Agent, or Firm* — Squire Patton Boggs (US) LLP

(57) ABSTRACT

An information processing method and apparatus are disclosed. The method comprises: obtaining a clicking command issued by a user for a target identifier corresponding to a target information object; obtaining a target link address to which the target identifier directs; when it is determined that the target link address to which the target identifier directs is not a preset address capable of being directly linked to detailed information corresponding to the target information object, predicting target loading time of the detailed information of the target information object; determining a target information category corresponding to the target loading time according to a preset relationship between loading time and information categories, and outputting target browsable information corresponding to the target identifier and belonging to the target information category, so as to display user browsable information before the preset address corresponding to the target information object is requested and thereby before the detailed information corresponding to the target information object is output according to the requested preset address. By means of the solution, the situation that a monotonous load box is displayed no matter whether the waiting time is long or short can be avoided.

16 Claims, 2 Drawing Sheets

(56) References Cited

U.S. PATENT DOCUMENTS

| | | | |
|---|---|---|---|
| 2008/0059571 A1* | 3/2008 | Khoo | G06Q 30/02 709/203 |
| 2012/0096431 A1* | 4/2012 | Madar | G06Q 30/0262 717/110 |
| 2012/0233631 A1* | 9/2012 | Geshwind | H04N 21/2547 725/1 |
| 2014/0376403 A1* | 12/2014 | Shao | H04W 8/18 370/254 |
| 2015/0154659 A1* | 6/2015 | Harrison | G06Q 30/0277 705/14.73 |

* cited by examiner

1

INFORMATION PROCESSING METHOD AND APPARATUS

The present application claims priority to the Chinese patent application No. 201410374080.7 filed before the Chinese Patent Office on Jul. 31, 2014, entitled "Information processing method and apparatus", which is incorporated in the present application by reference in its entirety.

TECHNICAL FIELD

The present application relates to the field of terminals, in particular to an information processing method and apparatus.

BACKGROUND ART

With the development of mobile advertising, a growing number of companies use various application platforms (such as: Myapp, Android Market, APPChina, google playstore, etc.) to display information objects thereof (such as: application software, information of entity products, company business, etc.) to users, such that users can get to know the information objects of companies easily.

In order to achieve a better promotion effect, the application platforms used by companies directly may also use other indirect application platforms to display information objects, such that after a clicking command is issued by a user for an identifier corresponding to an information object, the indirect application platforms will obtain a link address corresponding to the information object. However, the link address obtained by the indirect application platforms is not a preset address capable of being directly linked to detailed information corresponding to the information object. At this moment, the indirect application platforms send, based on a server corresponding to itself, a request to a server of an associated application platform corresponding to the link address for the preset address of the information object. If the associated application platform is an indirect application platform itself, then the associated application platform will continue to request a server of a corresponding associated application platform, and so on, until the associated application platform is the application platform directly used by the information object. After the preset address corresponding to the information object is obtained, based on the obtained preset address, the detailed information corresponding to the information object is further linked. Based on the above processing mechanism, the more the used indirect application platforms are, the longer the processing time is, and thereby the longer the waiting time for users is.

In prior art, before the preset address corresponding to the information object is requested, thereby before the detailed information corresponding to the information object is output based on the requested preset address, no matter whether the waiting time is long or short, each application platform will pop up a loading box containing progress information. However, users are generally averse to the loading box containing progress information, and they will cancel the request, thereby causing many losses in page views.

SUMMARY OF INVENTION

Based on the problems mentioned above, the embodiments of the present application disclose an information processing method and apparatus to avoid displaying a monotonous loading box no matter whether the waiting time is long or short. The technical solution is as follows:

According to the first aspect, the embodiments of the present application provide an information processing method, which comprises:

obtaining a clicking command issued by a user for a target identifier corresponding to a target information object;

in response to the clicking command, obtaining a target link address to which the target identifier directs;

determining whether the target link address to which the target identifier directs is a preset address capable of being directly linked to detailed information corresponding to the target information object;

if not, predicting target loading time of the detailed information of the target information object, determining, according to a preset relationship between loading time and information categories, a target information category corresponding to the target loading time, and outputting target browsable information corresponding to the target identifier and belonging to the target information category, so as to display user browable information before the preset address corresponding to the target information object is requested and thereby before the detailed information corresponding to the target information object is output according to the requested preset address.

Optionally, the information processing method provided by the embodiments of the present application further comprises:

when it is determined that the target link address to which the target identifier directs is the preset address capable of being directly linked to detailed information corresponding to the target information object, linking to the target link address to which the target identifier directs and outputting the detailed information corresponding to the target information object.

Optionally, the information categories comprise: information with entertainment nature, information with practical nature and introduction information of an information object.

Optionally, the step of predicting target loading time of the detailed information of the target information object comprises:

predicting, according to the target link address and/or current network environment, the target loading time of the detailed information of the target information object.

Optionally, the step of outputting target browsable information corresponding to the target identifier and belonging to the target information category comprises:

displaying an interface containing the target browsable information corresponding to the target identifier and belonging to the target information category;

or displaying a popup window containing the target browsable information corresponding to the target identifier and belonging to the target information category.

Optionally, the step of determining whether the target link address to which the target identifier directs is a preset address capable of being directly linked to detailed information corresponding to the target information object comprises:

determining whether the data format of the target link address to which the target identifier directs matches with a preset data format, if yes, it is indicated that the target link address to which the target identifier directs is the preset address capable of being directly linked to detailed information corresponding to the target information object.

Optionally, the step of determining whether the target link address to which the target identifier directs is a preset address capable of being directly linked to detailed information corresponding to the target information object comprises:

determining whether a matching preset character is contained in the target link address to which the target identifier directs, if yes, it is indicated that the target link address to which the target identifier directs is the preset address capable of being directly linked to detailed information corresponding to the target information object.

Optionally, the information processing method provided by the embodiments of the present application further comprises:

obtaining the preset address corresponding to the target information object from a corresponding server according to the target link address to which the target identifier directs;

outputting, according to the preset address corresponding to the target information object, the detailed information corresponding to the target information object, and hiding the target browsable information automatically.

Optionally, the information processing method provided by the embodiments of the present application further comprises:

obtaining the preset address corresponding to the target information object from a corresponding server according to the target link address to which the target identifier directs;

displaying prompt information of whether to open the detailed information;

after receiving a confirmation command for opening issued by a user based on the prompt information, in response to the confirmation command for opening, outputting the detailed information corresponding to the target information object according to the preset address corresponding to the target information object, and hiding the target browsable information automatically.

According to the second aspect, the embodiments of the present application also provide an information processing apparatus, which comprises:

a clicking command obtaining module for obtaining a clicking command issued by a user for a target identifier corresponding to a target information object;

a target link address obtaining module for, in response to the clicking command, obtaining a target link address to which the target identifier directs;

a determining module for determining whether the target link address to which the target identifier directs is a preset address capable of being directly linked to detailed information corresponding to the target information object; if not, triggering a target loading time predicting module;

the target loading time predicting module, used for predicting target loading time of the detailed information of the target information object;

a target information category determining module for determining, according to a preset relationship between loading time and information categories, a target information category corresponding to the target loading time;

a target browsable information outputting module for outputting target browsable information corresponding to the target identifier and belonging to the target information category, so as to display user browsable information before the preset address corresponding to the target information object is requested and thereby before the detailed information corresponding to the target information object is output according to the requested preset address.

Optionally, the information processing apparatus provided by the embodiments of the present application also comprises:

a first detailed information outputting module for, when it is determined that the target link address to which the target identifier directs is the preset address capable of being directly linked to detailed information corresponding to the target information object, linking to the target link address to which the target identifier directs and outputting the detailed information corresponding to the target information object.

Optionally, the information categories comprise: information with entertainment nature, information with practical nature and introduction information of an information object.

Optionally, the target loading time predicting module is specifically used for: predicting, according to the target link address and/or current network environment, target loading time of the detailed information of the target information object.

Optionally, the target browsable information outputting module is specifically used for:

displaying an interface containing the target browsable information corresponding to the target identifier and belonging to the target information category;

or displaying a popup window containing the target browsable information corresponding to the target identifier and belonging to the target information category.

Optionally, the determining module is specifically used for:

determining whether the data format of the target link address to which the target identifier directs matches with a preset data format, if yes, it is indicated that the target link address to which the target identifier directs is the preset address capable of being directly linked to detailed information corresponding to the target information object.

Optionally, the determining module is specifically used for:

determining whether a matching preset character is contained in the target link address to which the target identifier directs, if yes, it is indicated that the target link address to which the target identifier directs is the preset address capable of being directly linked to detailed information corresponding to the target information object.

Optionally, the information processing apparatus provided by the embodiments of the present application further comprises:

a preset address obtaining module for obtaining the preset address corresponding to the target information object from a corresponding server according to the target link address to which the target identifier directs;

a second detailed information outputting module for outputting, according to the preset address corresponding to the target information object, the detailed information corresponding to the target information object, and hiding the target browsable information automatically.

Optionally, the information processing apparatus provided by the embodiments of the present application further comprises:

a preset address obtaining module for obtaining the preset address corresponding to the target information object from a corresponding server according to the target link address to which the target identifier directs;

a prompt information display module for displaying prompt information of whether to open the detailed information;

a third detailed information outputting module for outputting, after receiving a confirmation command for opening issued by a user based on the prompt information, in response to the confirmation command for opening, the detailed information corresponding to the target information object according to the preset address corresponding to the target information object, and hiding the target browsable information automatically.

According to the third aspect, the embodiments of the present application also provide a terminal, which comprises: a processor, a memory, communication interfaces and communication bus;

the processor, the memory and the communication interfaces connecting to and communicating with each other via the communication bus;

the memory storing executable program codes;

the processor executing a program corresponding to the executable program codes by reading the executable program codes stored in the memory, so as to implement any one of information processing methods provided by the embodiments of the present application.

According to the forth aspect, the embodiments of the present application also provide a storage medium for storing application programs, which are used for implementing any one of information processing methods provided by the embodiments of the present application.

According to the fifth aspect, the embodiments of the present application also provide an application program, which is used for implementing any one of information processing methods provided by the embodiments of the present application.

In embodiments of the present application, obtaining a clicking command issued by a user for a target identifier corresponding to a target information object; in response to the clicking command, obtaining a target link address to which the target identifier directs; determining whether the target link address to which the target identifier directs is a preset address capable of being directly linked to detailed information corresponding to the target information object; if not, predicting the target loading time of the detailed information of the target information object, determining a target information category corresponding to the target loading time according to a preset relationship between loading time and information categories, and outputting target browsable information corresponding to the target identifier and belonging to the target information category, so as to display user browsable information before the preset address corresponding to the target information object is requested and thereby before the detailed information corresponding to the target information object is output according to the requested preset address. It can be seen that by means of the present solution, the situation that a monotonous loading box is displayed no matter whether the waiting time is long or short can be avoided, thereby improving use experiences.

BRIEF DESCRIPTION OF DRAWINGS

In order to describe the technical solution of the embodiments of the present application or in the prior art more clearly, a brief description of the accompanying drawings required for the embodiments of the present application and of the prior art will be given hereafter. It is obvious that the drawings in the following description are only some embodiments of the present application, those ordinary skilled in the art can obtain other drawings according to these accompanying drawings without any inventive efforts.

DETAILED DESCRIPTION OF THE INVENTION

In order to describe the objects, the technical solution and the advantages of the present application more clearly, the present application will be further described in detail with reference to the accompanying drawings in the following. It is obvious that the described embodiments are a part of embodiments of the present application, instead of all of them. Based on the embodiments of the present application, all of other embodiments obtained by those ordinary skilled in the art without any inventive efforts fall within the scope of protection of the present application.

The embodiments of the present application provide an information processing method and apparatus, in order to avoid the situation that a monotonous loading box is displayed no matter whether the waiting time is long or short, thereby improving use experiences.

Hereinafter, the information processing method provided by the embodiments of the present application will be described first.

It should be noted that the information processing method provided by the embodiments of the present application is applicable to a terminal. Specifically, in practical application, the terminal may be: a Smartphone, a tablet PC or a laptop, etc. Further, the functional software for implementing the information processing method provided by the embodiments of the present application can be an application platform itself, for example: Myapp, Android Market, APPChina, google playstore and so on.

Figure 1:
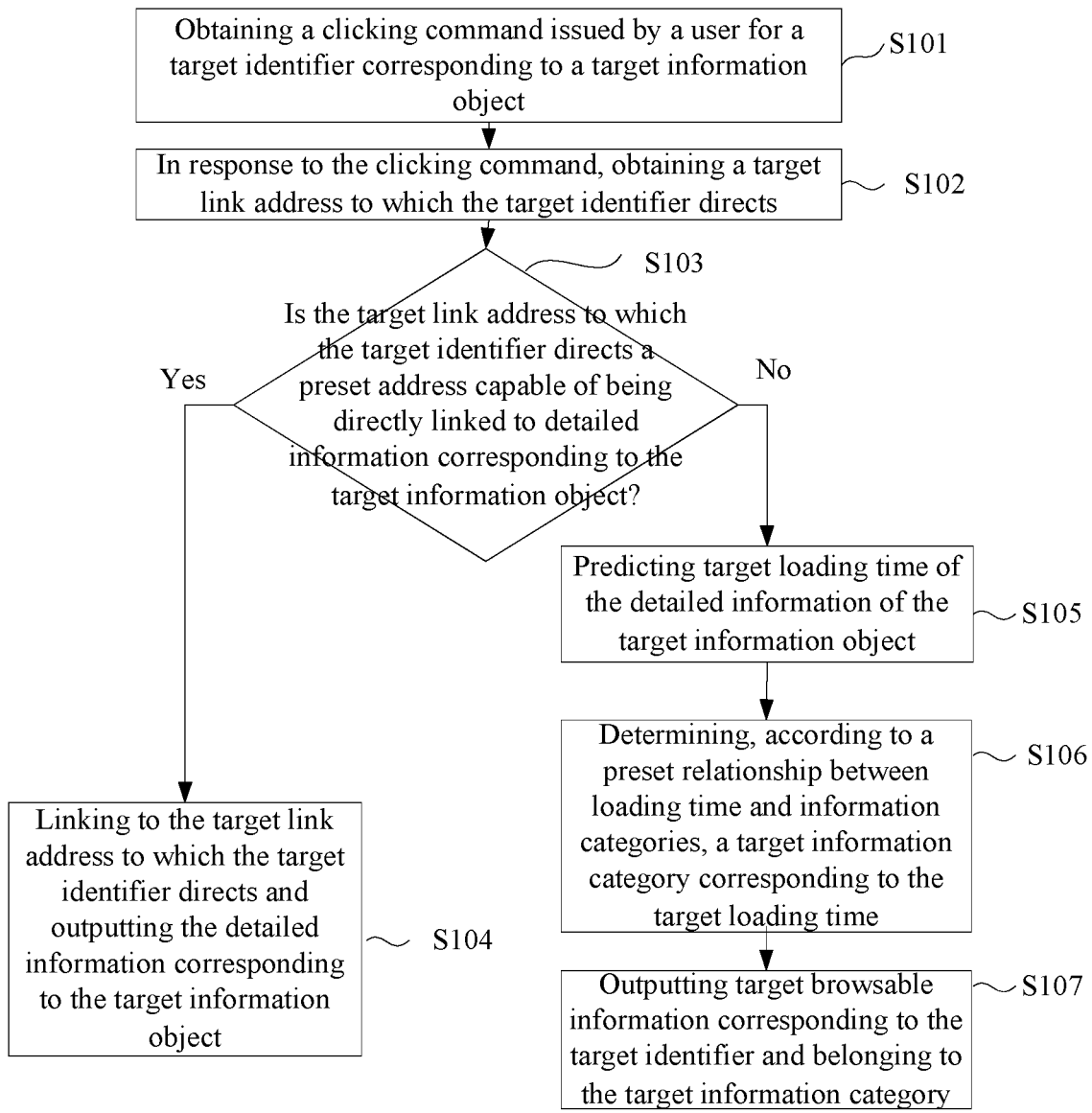
FIG. 1 is a flowchart of the information processing method provided by the embodiments of the present application.

As shown in FIG. 1, an information processing method may comprise:

S101: Obtaining a clicking command issued by a user for a target identifier corresponding to a target information object;

S102: In response to the clicking command, obtaining a target link address to which the target identifier directs;

When a user wishes to read the detailed information of the target information object in an application platform, he/she may click a target identifier corresponding to the target information object, and the terminal can obtain the clicking command issued by the user for the target identifier corresponding to the target information object, and obtain, in response to the clicking command, the target link address to which the target identifier directs.

S103: determining whether the target link address to which the target identifier directs is a preset address capable of being directly linked to detailed information corresponding to the target information object, if yes, executing S104; if not, executing S105;

Wherein, after obtaining the target link address to which the target identifier directs, it is possible to determine whether the target link address to which the target identifier directs is a preset address capable of being directly linked to detailed information corresponding to the target information object, and execute different operations according to determination results. Specifically, when it is determined that the target link address to which the target identifier directs is a preset address capable of being directly linked to detailed information corresponding to the target information object, since there is no time-consuming process for requesting the preset address corresponding to the target information object, S104 may be executed; when it is determined that the target link address to which the target identifier directs is not a preset address capable of being directly linked to detailed information corresponding to the target information object, since there is a time-consuming process for requesting the preset link address corresponding to the target information object, S105 may be executed.

Specifically, for example, the step of determining whether the target link address to which the target identifier directs is a preset address capable of being directly linked to detailed information corresponding to the target information object may comprise:

determining whether the data format of the target link address to which the target identifier directs matches with the preset data format, if yes, it is indicated that the target link address to which the target identifier directs is the preset address capable of being directly linked to detailed information corresponding to the target information object.

Specifically, for example, the step of determining whether the target link address to which the target identifier directs is a preset address capable of being directly linked to detailed information corresponding to the target information object may comprise:

determining whether a matching preset character is contained in the target link address to which the target identifier directs, if yes, it is indicated that the target link address to which the target identifier directs is a preset address capable of being directly linked to detailed information corresponding to the target information object.

It can be understood that the prior art may be used to determining whether the target link address to which the target identifier directs is a preset address capable of being directly linked to detailed information corresponding to the target information object, which is not repeated here in the present application since it does not belong to the inventive point.

S104: Linking to the target link address to which the target identifier directs and outputting the detailed information corresponding to the target information object;

Wherein, after it is determined that the target link address to which the target identifier directs is the preset address capable of being directly linked to detailed information corresponding to the target information object, it is possible to link to the target link address to which the target identifier directs and output the detailed information corresponding to the target information object.

S105: Predicting target loading time of the detailed information of the target information object;

In the present embodiment, in order to achieve the object of avoiding displaying a monotonous loading box no matter whether the waiting time is long or short, and thereby improving use experiences, browsable information belonging to different information categories is displayed to users according to different loading time. Specifically, if the loading time is too long, the selected information category may be an information category with abundant contents, and if the loading time is relatively short, the selected information category may be an information category with simple contents.

Based on the technical starting point mentioned above, when it is determined that the target link address to which the target identifier directs is not a preset address capable of being directly linked to detailed information corresponding to the target information object, it is possible to predict the target loading time of the detailed information of the target information object first.

In practical application, the target loading time of the detailed information of the target information object is predicted according to the target link address and/or current network environment, wherein the current network environment may specifically refer to the current network signal strength or current network speed and the like, all of which are reasonable. Specifically, when predicting loading time only according to the link address corresponding to an identifier of an information object, a relationship between the link address and the loading time may be preset, and thereby the target loading time may be predicted according to the target link address. When predicting loading time only according to network environment, a relationship between the network environment and the loading time may be preset, and thereby the target loading time may be predicted according to the determined current network environment. And when predicting loading time according to both of the link address corresponding to an identifier of an information object and network environment, a relationship between both of the link address and the network environment and loading time may be preset, and thereby the target loading time may be predicted according to both of the target link address and the current network environment.

S106: Determining, according to a preset relationship between loading time and information categories, a target information category corresponding to the target loading time;

Wherein, a relationship between the loading time and the information categories is preset so as to: after the target loading time of the detailed information of the target information object is predicted, it is possible to determine the target information category corresponding to the target loading time according to the relationship between loading time and information categories. It should be noted that the amount of information contained in browsable information of various information categories are different, that is to say the content richness is different in order to adapt to the reading demands of users under different waiting time.

The information categories may comprise: information with entertainment nature, information with practical nature and introduction information of an information object. Specifically, the information with entertainment nature may be, for example jokes, entertainment gossips, etc.; the information with practical nature may be, for example life tips; and the introduction information of an information object may be, for example a functional introduction of an information object. It should be emphasized that the amount of information corresponding to each information category may be set according to practical application scenarios, thereby creating a corresponding relationship between loading time and information categories after the amount of information corresponding to each information category is determined.

S107: Outputting target browsable information corresponding to the target identifier and belonging to the target information category.

Wherein, for an identifier of one information object, it is possible to preset browsable information corresponding to various information categories, so as to output the target browsable information corresponding to the target identifier and belonging to the target information category after the target information category is determined.

It could be understood that for the information category with entertainment nature or with practical nature, since it is irrelevant to the information object but relevant to the loading time, the identifier of each information object may correspond to identical browsable information; and for an information category that is introduction information of an information object, since it is relevant to an information object, the identifier of each information object may correspond to the browsable information thereof respectively.

Specifically, the step of outputting target browsable information corresponding to the target identifier and belonging to the target information category may comprise:

displaying an interface containing the target browsable information corresponding to the target identifier and belonging to the target information category;

or displaying a popup window containing the target browsable information corresponding to the target identifier and belonging to the target information category.

The specific implementation way provided above of outputting target browsable information corresponding to the target identifier and belonging to the target information category is only an example, to which the embodiments of the present application are not limit.

In embodiments of the present application, obtaining a clicking command issued by a user for a target identifier corresponding to a target information object; in response to the clicking command, obtaining a target link address to which the target identifier directs; determining whether the target link address to which the target identifier directs is a preset address capable of being directly linked to detailed information corresponding to the target information object; if not, predicting the target loading time of the detailed information of the target information object, determining a target information category corresponding to the target loading time according to a preset relationship between loading time and information categories, and outputting target browsable information corresponding to the target identifier and belonging to the target information category, so as to display user browsable information before the preset address corresponding to the target information object is requested and thereby before the detailed information corresponding to the target information object is output according to the requested preset address. It can be seen that by means of the present solution, the situation that a monotonous loading box is displayed no matter whether the waiting time is long or short can be avoided, thereby improving use experiences.

Furthermore, the information processing method provided by the embodiments of the present application may comprise:

obtaining the preset address corresponding to the target information object from a corresponding server according to the target link address to which the target identifier directs;

outputting, according to the preset address corresponding to the target information object, the detailed information corresponding to the target information object, and hiding the target browsable information automatically.

Furthermore, the information processing method provided by the embodiments of the present application may comprise:

obtaining the preset address corresponding to the target information object from a corresponding server according to the target link address to which the target identifier directs;

displaying prompt information of whether to open the detailed information;

after receiving a confirmation command for opening issued by a user based on the prompt information, in response to the confirmation command for opening, outputting the detailed information corresponding to the target information object according to the preset address corresponding to the target information object, and hiding the target browsable information automatically.

It should be noted that the specific implementation way provided above of obtaining a preset address corresponding to a target information object from a corresponding server according to the target link address to which the target identifier directs may be implemented based on the prior art, which is not described here.

Figure 2:
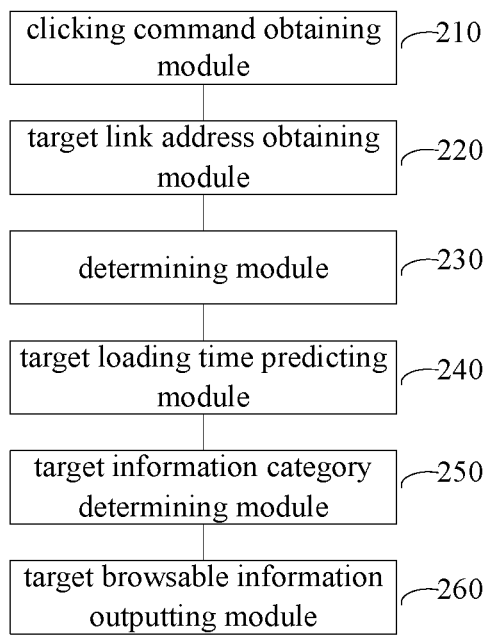
FIG. 2 is a schematic structural diagram of the information processing apparatus provided by the present application.

Corresponding to the embodiments of the method mentioned above, the embodiments of the present application also provide an information processing apparatus. As shown in FIG. 2, the apparatus may comprise:

a clicking command obtaining module 210 for obtaining a clicking command issued by a user for a target identifier corresponding to a target information object;

a target link address obtaining module 220 for, in response to the clicking command, obtaining a target link address to which the target identifier directs;

a determining module 230 for determining the target link address to which the target identifier directs is a preset address capable of being directly linked to detailed information corresponding to the target information object; if not, triggering a target loading time predicting module 240;

the target loading time predicting module 240 is used for predicting target loading time of the detailed information of the target information object;

a target information category determining module 250 for determining, according to a preset relationship between loading time and information categories, a target information category corresponding to the target loading time;

a target browsable information outputting module 260 for outputting target browsable information corresponding to the target identifier and belonging to the target information category, so as to display user browsable information before the preset address corresponding to the target information object is requested and thereby before the detailed information corresponding to the target information object is output according to the requested preset address.

In embodiments of the present application, obtaining a clicking command issued by a user for a target identifier corresponding to a target information object; in response to the clicking command, obtaining a target link address to which the target identifier directs; determining whether the target link address to which the target identifier directs is a preset address capable of being directly linked to detailed information corresponding to the target information object; if not, predicting the target loading time of the detailed information of the target information object, determining a target information category corresponding to the target loading time according to a preset relationship between loading time and information categories, and outputting target browsable information corresponding to the target identifier and belonging to the target information category, so as to display user browsable information before the preset address corresponding to the target information object is requested and thereby before the detailed information corresponding to the target information object is output according to the requested preset address. It can be seen that by means of the present solution, the situation that a monotonous loading box is displayed no matter whether the waiting time is long or short can be avoided, thereby improving use experiences.

Furthermore, the information processing apparatus provided by the embodiments of the present application may also comprise:

a first detailed information outputting module for, when it is determined that the target link address to which the target identifier directs is the preset address capable of being directly linked to detailed information corresponding to the target information object, linking to the target link address to which the target identifier directs and outputting the detailed information corresponding to the target information object.

Specifically, the information categories may comprise: information with entertainment nature, information with practical nature and introduction information of an information object.

Specifically, the target loading time predicting module 240 is specifically used for: predicting, according to the target link address and/or current network environment, target loading time of the detailed information of the target information object.

Specifically, the target browsable information outputting module 260 is specifically used for:

displaying an interface containing the target browsable information corresponding to the target identifier and belonging to the target information category;

or displaying a popup window containing the target browsable information corresponding to the target identifier and belonging to the target information category.

Specifically, the determining module 230 is specifically used for:

determining whether the data format of the target link address to which the target identifier directs matches with a preset data format, if yes, it is indicated that the target link address to which the target identifier directs is the preset address capable of being directly linked to detailed information corresponding to the target information object.

Specifically, the determining module 230 is specifically used for:

determining whether a matching preset character is contained in the target link address to which the target identifier directs, if yes, it is indicated that the target link address to which the target identifier directs is the preset address capable of being directly linked to detailed information corresponding to the target information object.

Furthermore, the information processing apparatus provided by the embodiments of the present application may further comprise:

a preset address obtaining module for obtaining the preset address corresponding to the target information object from a corresponding server according to the target link address to which the target identifier directs;

a second detailed information outputting module for outputting, according to the preset address corresponding to the target information object, the detailed information corresponding to the target information object, and hiding the target browsable information automatically.

Furthermore, the information processing apparatus provided by the embodiments of the present application may further comprise:

a preset address obtaining module for obtaining the preset address corresponding to the target information object from a corresponding server according to the target link address to which the target identifier directs;

a prompt information display module for displaying prompt information of whether to open the detailed information;

a third detailed information outputting module for outputting, after receiving a confirmation command for opening issued by a user based on the prompt information, in response to the confirmation command for opening, the detailed information corresponding to the target information object according to the preset address corresponding to the target information object, and hiding the target browsable information automatically.

In addition, the embodiments of the present application also provide a terminal, which comprises: a processor, a memory, communication interfaces and communication bus; the processor, the memory and the communication interfaces connecting to and communicating with each other via the communication bus;

the memory storing executable program codes;

the processor executing a program corresponding to the executable program codes by reading the executable program codes stored in the memory, so as to implement any one of information processing methods provided by the embodiments of the present application. Wherein, the information processing method provided by the embodiments of the present application comprises:

obtaining a clicking command issued by a user for a target identifier corresponding to a target information object;

in response to the clicking command, obtaining a target link address to which the target identifier directs;

determining whether the target link address to which the target identifier directs is a preset address capable of being directly linked to detailed information corresponding to the target information object;

if not, predicting target loading time of the detailed information of the target information object, determining, according to a preset relationship between loading time and information categories, a target information category corresponding to the target loading time; and outputting target browsable information corresponding to the target identifier and belonging to the target information category, so as to display user browsable information before the preset address corresponding to the target information object is requested and thereby before the detailed information corresponding to the target information object is output according to the requested preset address.

In addition, the embodiments of the present application also provide a storage medium for storing application programs, which are used for implementing any one of information processing methods provided by the embodiments of the present application. Wherein the information processing method provided by the embodiments of the present application comprises:

obtaining a clicking command issued by a user for a target identifier corresponding to a target information object;

in response to the clicking command, obtaining a target link address to which the target identifier directs;

determining whether the target link address to which the target identifier directs is a preset address capable of being directly linked to detailed information corresponding to the target information object;

if not, predicting target loading time of the detailed information of the target information object, determining, according to a preset relationship between loading time and information categories, a target information category corresponding to the target loading time, and outputting target browsable information corresponding to the target identifier and belonging to the target information category, so as to display user browsable information before the preset address corresponding to the target information object is requested and thereby before the detailed information corresponding to the target information object is output according to the requested preset address.

In addition, the embodiments of the present application also provide an application program, which is used for implementing any one of information processing methods provided by the embodiments of the present application. Wherein the information processing method provided by the embodiments of the present application comprises:

obtaining a clicking command issued by a user for a target identifier corresponding to a target information object;

in response to the clicking command, obtaining a target link address to which the target identifier directs;

determining whether the target link address to which the target identifier directs is a preset address capable of being directly linked to detailed information corresponding to the target information object;

if not, predicting target loading time of the detailed information of the target information object, determining, according to a preset relationship between loading time and information categories, a target information category corresponding to the target loading time; and outputting target browsable information corresponding to the target identifier and belonging to the target information category, so as to display user browsable information before the preset address corresponding to the target information object is requested and thereby before the detailed information corresponding to the target information object is output according to the requested preset address.

For embodiments of the system or apparatus, since they are similar to the embodiments of the method, reference can be made to the relevant contents in the description of the method.

It should be noted that in the present application, relational terms such as first, second, etc. are merely used to distinguish one entity or operation from another entity or operation, without necessarily requiring or implying any actual relation or order between such entities or operations. Furthermore, terms "comprise", "contain" or any other variations thereof are intended to cover a non-exclusive inclusion, such that the process, the method, the article or the apparatus comprising a series of elements comprise not only those elements, but also other elements not listed explicitly, or further comprise the elements inherent to the process, the method, the article or the apparatus. Without more constraints, the elements defined by the statement of "including a . . . " does not exclude the situation that there exist other identical elements in the process, the method, the article or the device comprising said elements.

It may be understood by those ordinary skilled in the art that, all or part of the method steps in the foregoing embodiments can be achieved by instructing relevant hardware by a computer program, the program may be stored in computer readable storage medium, wherein the storage medium referred to herein may be for example a read-only memory (ROM)/a random access memory (RAM), a magnetic disc, a optical disc and on the like.

The above disclosed embodiments are only the preferred ones of the present application, to which the present application is not limit. As a result, any modifications, equivalent alterations and improvements made within the spirit and the principle of the present application still fall within the scope of the present application.

What is claimed is:

1. An information processing method, characterized in that the method comprises:
   obtaining a clicking command issued by a user for a target identifier corresponding to a target information object;
   in response to the clicking command, obtaining a target link address to which the target identifier directs;
   determining whether the target link address to which the target identifier directs is a preset address capable of being directly linked to detailed information corresponding to the target information object;
   if yes, linking to the target link address to which the target identifier directs and outputting the detail information corresponding to the target information object,
   if not, predicting target loading time of the detailed information of the target information object, determining, according to a preset relationship between loading time and information categories, a target information category corresponding to the target loading time, and outputting target browsable information corresponding to the target identifier and belonging to the target information category, so as to display user browsable information before the preset address corresponding to the target information object is requested and thereby before the detailed information corresponding to the target information object is output according to the requested preset address, and
   wherein the step of predicting target loading time of the detailed information of the target information object comprises: predicting, according to the target link address, the target loading time of the detailed information of the target information object, and
   wherein the information categories comprise an entertainment category, a practical nature category, and an introduction information of an information object category, and
   wherein the introduction information of an information object category is determined based on the target identifier and a predicted target loading time;
   wherein the entertainment category and practical nature category are determined based on the predicted target loading time and not the target identifier.

2. The method according to claim 1, characterized in that the method further comprises:
   when it is determined that the target link address to which the target identifier directs is the preset address capable of being directly linked to detailed information corresponding to the target information object, linking to the target link address to which the target identifier directs and outputting the detailed information corresponding to the target information object.

3. The method according to claim 1, characterized in that the step of predicting target loading time of the detailed information of the target information object comprises:
   predicting, according to the target link address and current network environment, the target loading time of the detailed information of the target information object.

4. The method according to claim 1, characterized in that the step of outputting target browsable information corresponding to the target identifier and belonging to the target information category comprises:
   displaying an interface containing the target browsable information corresponding to the target identifier and belonging to the target information category; or
   displaying a popup window containing the target browsable information corresponding to the target identifier and belonging to the target information category.

5. The method according to claim 1, characterized in that the step of determining whether the target link address to which the target identifier directs is a preset address capable of being directly linked to detailed information corresponding to the target information object comprises:
   determining whether the data format of the target link address to which the target identifier directs matches with a preset data format, if yes, it is indicated that the target link address to which the target identifier directs is the preset address capable of being directly linked to detailed information corresponding to the target information object.

6. The method according to claim 1, characterized in that the step of determining whether the target link address to which the target identifier directs is a preset address capable of being directly linked to detailed information corresponding to the target information object comprises:

determining whether a matching preset character is contained in the target link address to which the target identifier directs, if yes, it is indicated that the target link address to which the target identifier directs is the preset address capable of being directly linked to detailed information corresponding to the target information object.

7. The method according to claim 1, characterized in that the method further comprises:

obtaining the preset address corresponding to the target information object from a corresponding server according to the target link address to which the target identifier directs;

outputting, according to the preset address corresponding to the target information object, the detailed information corresponding to the target information object, and hiding the target browsable information automatically.

8. The method according to claim 1, characterized in that the method further comprises:

obtaining the preset address corresponding to the target information object from a corresponding server according to the target link address to which the target identifier directs;

displaying prompt information of whether to open the detailed information;

after receiving a confirmation, command for opening issued by a user based on the prompt information, in response to the confirmation command for opening, outputting the detailed information corresponding to the target information object according to the preset address corresponding to the target information object, and hiding the target browsable information automatically.

9. A terminal, characterized in that the terminal comprises:

a processor, a memory, communication interfaces and communication bus;

the processor, the memory and the communication interfaces connecting to and communicating with each other via the communication bus;

the memory storing executable program codes;

obtaining a clicking command issued by a user for a target identifier corresponding to a target information object;

in response to the clicking command, obtaining a target link address to which the target identifier directs;

determining whether the target link address to which the target identifier directs is a preset address capable of being directly linked to detailed information corresponding to the target information object;

if yes, linking to the target link address to which the target identifier directs and outputting the detail information corresponding to the target information object, if not, predicting target loading time of the detailed information of the target information object, determining, according to a preset relationship between loading time and information categories, a target information category corresponding to the target loading time, and outputting target browsable information corresponding to the target identifier and belonging to the target information category, so as to display user browsable information before the preset address corresponding to the target information object is requested and thereby before the detailed information corresponding to the target information object is output according to the requested preset address, and wherein the step of predicting target loading time of the detailed information of the target information object comprises: predicting, according to the target link address, the target loading time of the detailed information of the target information object, and wherein the information categories comprise an entertainment category, a practical nature category, and an introduction information of an information object category, and wherein the introduction information of an information object category is determined based on the target identifier and a predicted target loading time;

wherein the entertainment category and practical nature category are determined based on the predicted target loading time and not the target identifier.

10. The terminal according to claim 9, characterized in that, the processor of the terminal further performs the steps of:

when it is determined that the target link address to which the target identifier directs is the preset address capable of being directly linked to detailed information corresponding to the target information object, linking to the target link address to which the target identifier directs and outputting the detailed information corresponding to the target information object.

11. The terminal according to claim 9, characterized in that the step of predicting target loading time of the detailed information of the target information object comprises: predicting, according to the target link address and current network environment, target loading time of the detailed information of the target information object.

12. The terminal according to claim 9, characterized in that, the step of outputting target browsable information corresponding to the target identifier and belonging to the target information category comprises:

displaying an interface containing the target browsable information corresponding to the target identifier and belonging to the target information category; or displaying a popup window containing the target browsable information corresponding to the target identifier and belonging to the target information category.

13. The terminal according to claim 9, characterized in that,-the step of determining whether the target link address to which the target identifier directs is a preset address capable of being directly linked to detailed information corresponding to the target information object comprises:

determining whether the data format of the target link address to which the target identifier directs matches with a preset data format, if yes, it is indicated that the target link address to which the target identifier directs is the preset address capable of being directly linked to detailed information corresponding to the target information object.

14. The terminal according to claim 9, characterized in that, the step of determining whether the target link address to which the target identifier directs is a preset address capable of being directly linked to detailed information corresponding to the target information object comprises:

determining whether a matching preset character is contained in the target link address to which the target identifier directs, if yes, it is indicated that the target link address to which the target identifier directs is the preset address capable of being directly linked to detailed information corresponding to the target information object.

15. The terminal according to claim 9, characterized in that, the processor of the terminal further performs the step of:
- obtaining the preset address corresponding to the target information object from a corresponding server according to the target link address to which the target identifier directs;
- outputting, according to the preset address corresponding to the target information object, the detailed information corresponding to the target information object, and hiding the target browsable information automatically.

16. The terminal according to claim 9, characterized in that, the processor of the terminal further performs the step of:
- obtaining the preset address corresponding to the target information object from a corresponding server according to the target link address to which the target identifier directs;
- displaying prompt information of whether to open the detailed information;
  - after receiving a confirmation command for opening issued by a user based on the prompt information, in response to the confirmation command for opening, the detailed information corresponding to the target information object according to the preset address corresponding to the target information object, and hiding the target browsable information automatically.

* * * * *